(No Model.)
C. F. HOYT.
PUMP VALVE.
No. 383,811. Patented May 29, 1888.
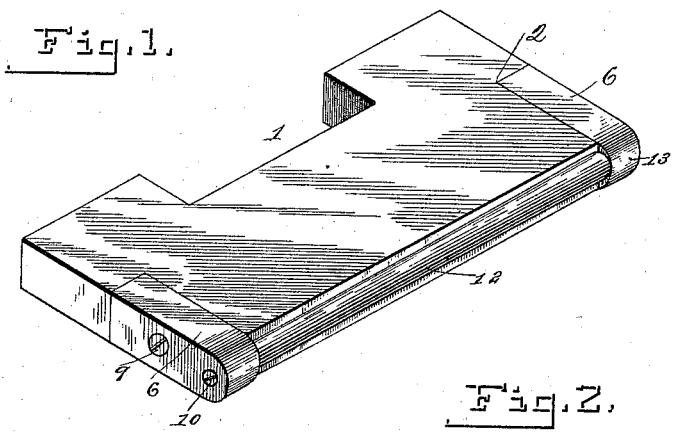
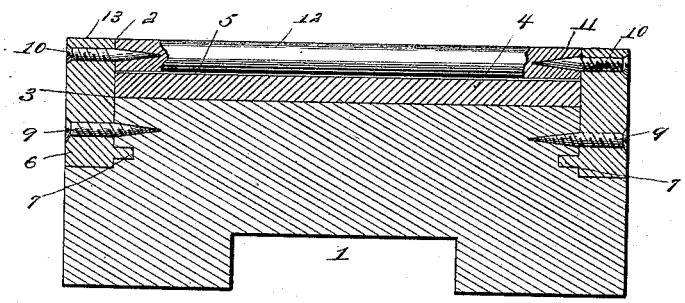
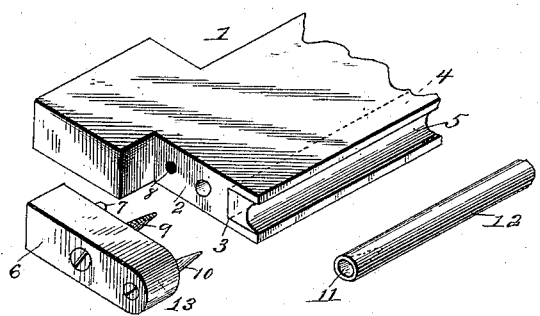
Witnesses.
Harry S. Rohrer.
Frank R. Stuart.
Inventor.
Charles F. Hoyt.
By his Attorneys.
Marble & Mason.

UNITED STATES PATENT OFFICE.

CHARLES F. HOYT, OF SIOUX CITY, IOWA.

PUMP-VALVE.

SPECIFICATION forming part of Letters Patent No. 383,811, dated May 29, 1888.

Application filed May 23, 1887. Serial No. 239,163. (No model.)

*To all whom it may concern:*

Be it known that I, CHARLES F. HOYT, a citizen of the United States, residing in Sioux City, in the county of Woodbury and State of Iowa, have invented a new and useful Improvement in Pump-Valves, of which the following is a specification.

My invention relates to valves or pistons for rotary pumps or engines of that class in which a sliding or swinging valve or piston or a number of sliding or swinging valves or pistons serve to form partitions between the part of the cylinder having the inlet-port and the part having the exhaust-port; and it consists in the improved construction and combination or arrangement of the parts of such a valve or piston provided with an anti-friction roller in its outer edge, which is hereinafter fully disclosed in the description, drawings, and claims.

The object of my invention is to provide an anti-friction roller in the outer edge of a valve or piston for the purpose of reducing the frictional resistance between said edge and the inner wall of the cylinder or the periphery of the revolving eccentric-piston, or whatever surface they may be in contact with.

In the accompanying drawings, which form part of this specification, and in which the same reference-numerals indicate the same or corresponding parts, Figure 1 represents a perspective view of my improved valve or piston; Fig. 2, a sectional view of the same, taken in a plane parallel with the faces of the valve or piston and axially through a part of the roller; and Fig. 3, perspective detail views, detached, of one corner of the valve or piston, the fastening-block for the roller, and one end of said roller, the parts being shown approximately in their relative positions.

In the drawings, the numeral 1 indicates the piston or valve, which has the outer corners of its ends cut away, so as to form recesses 2, and its outer edge grooved or recessed, as at 3, in which is placed a lining, 4, having a cylindrically-grooved outer side, 5, said lining being formed of any suitable anti-friction metal. Two blocks, 6, are fitted into the recesses in the corners of the valve or piston, and from their inner faces project studs 7, which fit into holes 8, formed in the walls of said recesses. Fastening-screws 9 pass through the blocks 6 and into the walls of the recesses 2; also, smooth-pointed screws 10 pass through the outer ends of said blocks, their inner conical or pointed smooth ends forming pivots for the conically-recessed ends 11 of the anti-friction roller 12. The outer ends or faces, 13, of the blocks or pivot-supports 6 are rounded or curved to correspond to the exposed periphery of the roller 12 while resting in the groove of the anti-friction lining in the outer edge of the valve or piston, so as to practically form continuations of the periphery of said roller.

From the construction thus disclosed it will be seen that the roller will reduce the frictional resistance between the edge of the piston or valve and the opposing surface, that it will turn freely upon the pivots and find support or bearing throughout the length of the groove in the anti-friction lining, that said lining will form a firm support for said roller if it be subjected to any strain, and at the same time that it will offer but little frictional resistance to the revolutions of said roller.

By pivoting or journaling the roller upon and between the two smooth-pointed screws it will be obvious that it will be securely held in its place in the groove or recess in the lining in the outer edge of the valve or piston, and that should said roller require any repair, renewal, or similar attention it may be removed by the removal of one of the blocks from the corner recesses of the valve or piston, which may be effected by the detachment of only one head of the cylinder and without removing said valve or piston from the cylinder.

The studs upon the faces of the inner ends of the blocks, which fit into the holes in the walls of the recessed corners of the valve or piston, will, in connection with the fastening-screws, secure said blocks firmly in place, and at the same time will form an easily-detachable fastening for each block, as only one screw will require removal for its detachment; also, each stud will serve as effectively for retaining the block in place when the single screw is inserted as would another screw.

Having thus fully described my invention, what I claim as new is—

1. The combination of a valve or piston formed with a groove or recess in its outer edge and with recessed outer corners, a roller formed with conical recesses in its ends, and blocks removably secured in said recessed corners and provided with screws having conical or pointed ends for said conical recesses in the ends of said roller, substantially as described.

2. The combination of a valve or piston formed with recessed outer corners, with holes in its outer corners, and with a groove or recess in its outer edge, and provided with a lining of anti-friction material having a cylindrical groove in its outer side, an anti-friction roller supported in said groove and formed with conical recesses in its ends, and blocks fitted in said recessed outer corners of the valve or piston and formed with inwardly-projecting studs fitting in holes formed in the walls of said recessed outer corners of the valve or piston, and provided with fastening-screws entering the walls of said recesses and with conically-pointed screws for said conical recesses in the ends of said roller, substantially as described.

CHARLES F. HOYT.

Witnesses:
 LEMUEL S. FAWCETT,
 W. W. BYAM.